US008692488B2

(12) United States Patent
Takayama et al.

(10) Patent No.: US 8,692,488 B2
(45) Date of Patent: Apr. 8, 2014

(54) MOTOR CONTROL APPARATUS FOR SYNCHRONOUSLY CONTROLLING MASTER AXIS AND SLAVE AXIS

(75) Inventors: Kenichi Takayama, Yamanashi (JP); Hiroyuki Kawamura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/616,242

(22) Filed: Sep. 14, 2012

(65) Prior Publication Data

US 2013/0134919 A1 May 30, 2013

(30) Foreign Application Priority Data

Nov. 25, 2011 (JP) .................. 2011-258008

(51) Int. Cl.
*H02P 5/00* (2006.01)
(52) U.S. Cl.
USPC ............................... 318/49; 318/52
(58) Field of Classification Search
USPC .................. 318/49, 51, 77, 85, 112
See application file for complete search history.

(56) References Cited

U.S. PATENT DOCUMENTS

| 6,823,235 | B2 * | 11/2004 | Toyozawa et al. | 700/193 |
| 7,183,739 | B2 * | 2/2007 | Iwashita et al. | 318/625 |
| 7,847,502 | B2 * | 12/2010 | Iwashita et al. | 318/567 |
| 2005/0248304 | A1 | 11/2005 | Endou et al. | |
| 2006/0158143 | A1 * | 7/2006 | Okita et al. | 318/276 |
| 2007/0007926 | A1 | 1/2007 | Iwashita et al. | |
| 2008/0218116 | A1 | 9/2008 | Maeda et al. | |
| 2012/0190274 | A1 | 7/2012 | Ito et al. | |

FOREIGN PATENT DOCUMENTS

| CN | 101261509 A | 9/2008 |
| CN | 1892523 B | 10/2010 |
| JP | 59-232750 A | 12/1984 |
| JP | 4-42307 A | 2/1992 |
| JP | 8-202420 A | 9/1996 |
| JP | 3171770 B2 | 6/2001 |
| JP | 2003165024 A | 6/2003 |
| JP | 2005-322076 A | 11/2005 |
| JP | 3756445 B2 | 3/2006 |
| JP | 200721692 A | 2/2007 |
| WO | 2011043225 A1 | 4/2011 |

OTHER PUBLICATIONS

Office Action corresponding to JP 2011-258008, dated Jan. 15, 2013.

* cited by examiner

*Primary Examiner* — Rina Duda
(74) *Attorney, Agent, or Firm* — Lowe Hauptman & Ham, LLP

(57) ABSTRACT

A motor control apparatus for synchronously controlling a master axis motor for driving a master axis and a slave axis motor for driving a slave axis, includes: a master axis position detector which outputs position data of the master axis and a reference signal with a predetermined fixed period; a master axis receiving circuit which receives the position data and the reference signal output from the master axis position detector; a master axis computation circuit which computes a master axis error representing a difference between the position data received by the master axis receiving circuit and the position data acquired at the time of the reception of the reference signal; and a slave axis motor control unit which controls the operation of the slave axis motor by using the master axis error as a command for synchronizing the operation of the master axis motor.

8 Claims, 10 Drawing Sheets

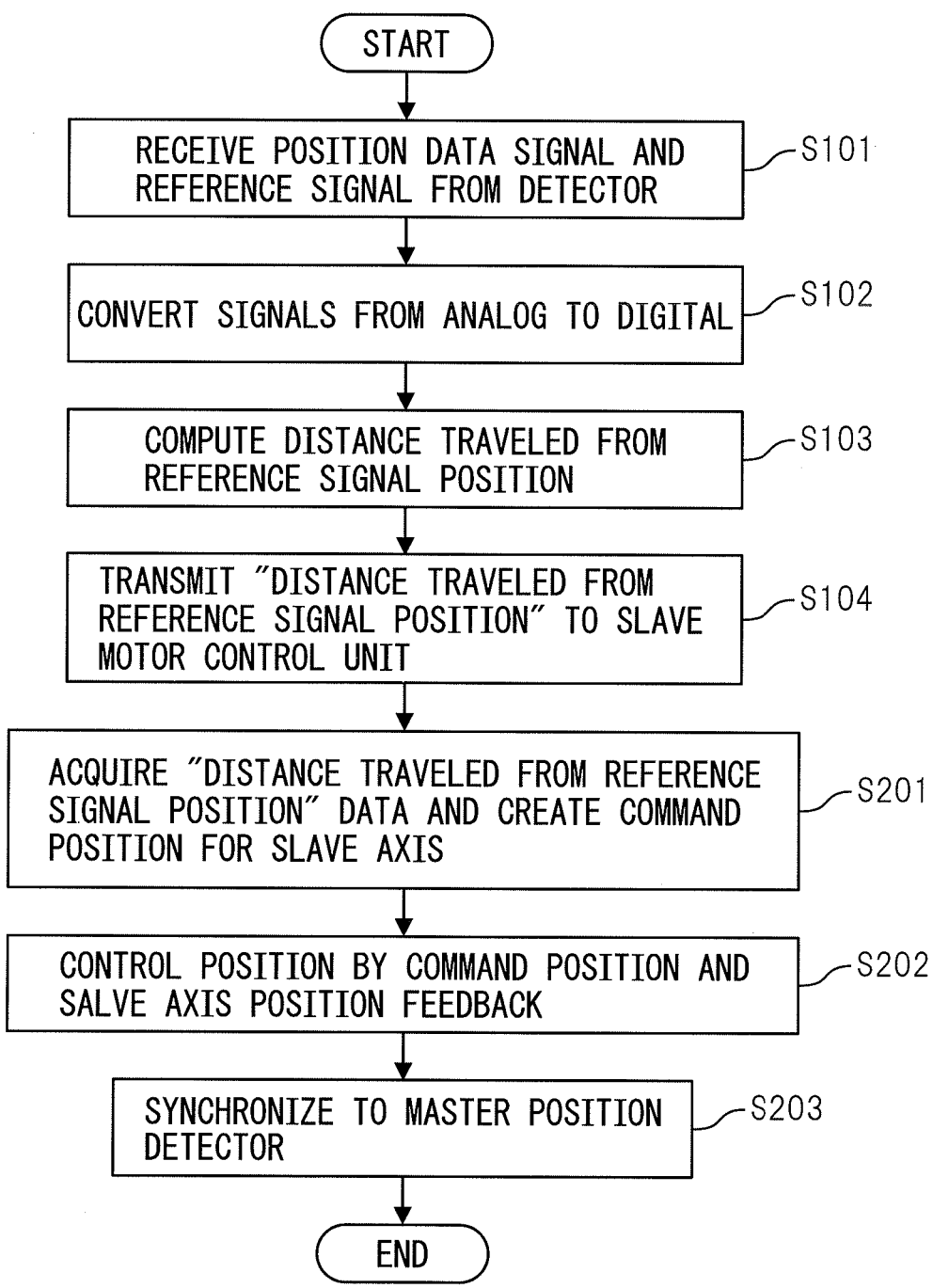

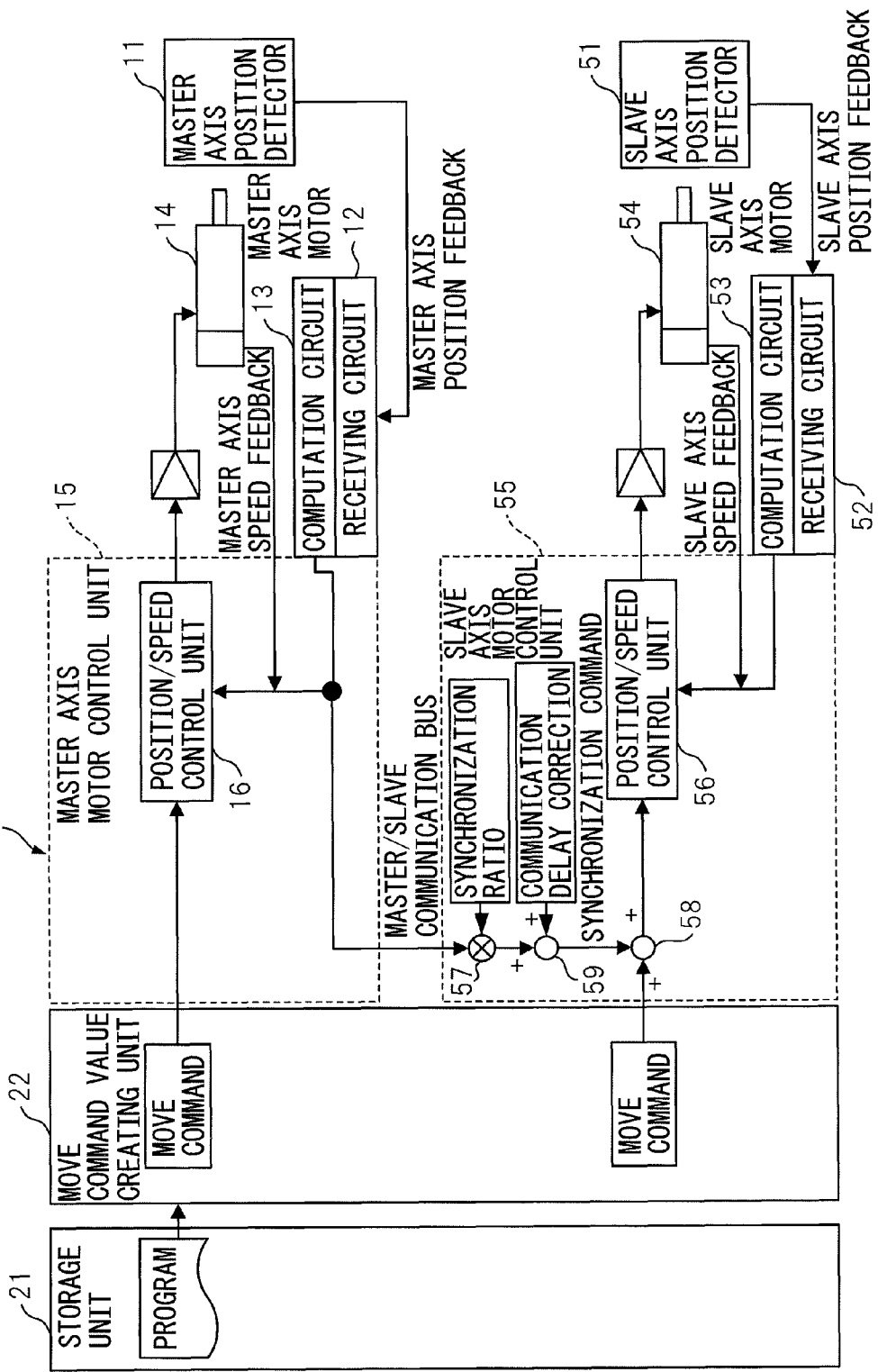

MOTOR CONTROL APPARATUS FOR SYNCHRONOUSLY CONTROLLING MASTER AXIS AND SLAVE AXIS

RELATED APPLICATIONS

The present application is claims priority from, Japanese Application Number 2011-258008, filed Nov. 25, 2011, the disclosure of which is hereby incorporated by reference herein in its entirety.

BACKGROUND OF THE INVENTION

1. Field of the Invention

The present invention relates to a motor control apparatus for synchronously controlling a master axis motor for driving a master axis and a slave axis motor for driving a slave axis.

2. Description of the Related Art

In a machine tool, motors are provided for each drive axis of a machine tool, and are driven and controlled by a motor control apparatus. The motor control apparatus controls the motor speed, torque, or rotor position of each of the motors that drive the respective drive axes of the machine tool.

FIG. 7 is a diagram for explaining a tool axis and a work axis in a gear driven machine. The drive axes of the gear turning machine include an axis (tool axis) for driving a tool such as a grinding wheel or a cutter and an axis (work axis) for driving a workpiece. The tool axis and the work axis are mechanically coupled together via a work gear.

It is known to provide a master-slave synchronizing method, such as disclosed in Japanese Unexamined Patent Publication No. H04-42307 for a gear driven machine, in which the motor for driving the tool axis is designated as the master axis motor and the position data detected on the master axis motor is also utilized as a command to the slave axis motor for driving the work axis, thereby controlling the master axis and the slave axis in a phase (rotational angle) synchronized fashion.

FIG. 8 is a basic functional block diagram schematically illustrating a circuit for synchronized control of the master axis and the slave axis according to the prior art. It is to be understood that, throughout the different drawings given herein, the same reference numerals designate component elements having the same functions. In the motor control apparatus 100 according to the prior art, position data and a reference signal with a predetermined fixed period (for example, a one-rotation signal), as analog signals output from a master axis position detector 111 provided for the master axis, are each branched by a branch circuit 110 and supplied to receiving circuits 112 and 152 provided for the master axis and the slave axis, respectively, and computation circuits 113 and 153 connected to the respective receiving circuits 112 and 152 each create angle information representing the "distance traveled from the reference signal position," and transmit the angle information to a master axis motor control unit 115, which controls the operation of the master axis motor for driving the master axis, and a slave axis motor control unit 155, which controls the operation of the slave axis motor for driving the slave axis, respectively. Then, based on the separately received angle information, the master axis motor control unit 115 and the slave axis motor control unit 155 synchronously control the master axis motor and the slave axis motor so that the phase (rotational speed) is matched between the master axis and the slave axis.

FIG. 9 is a block diagram showing in further detail the configuration depicted in the basic functional block diagram of FIG. 8. A move command value creating unit 122 creates move commands for the master axis motor 114 and the slave axis motor 154, respectively, in accordance with a program stored in a storage unit 121, and supplies the move commands to the master axis motor control unit 115 and the slave axis motor control unit 155, respectively. A position/speed control unit 116 in the master axis motor control unit 115 controls the rotor position (master axis position) and rotational speed of the master axis motor 114 on the basis of the move command, the rotational speed fed back from the master axis motor 114 (master axis speed feedback), and the angle information fed back from the master axis position detector 111 (master axis position feedback). On the other hand, a position/speed control unit 156 in the slave axis motor control unit 155 controls the rotor position (slave axis position) and rotational speed of the slave axis motor 154 on the basis of the move command, the rotational speed fed back from the slave axis motor 154 (slave axis speed feedback), and the angle information supplied from the master axis position detector 111 via the branch circuit 110. As described with reference to FIG. 8, the position data and the reference signal with a predetermined fixed period (for example, a one-rotation signal), output from the master axis position detector 111, are each branched by the branch circuit 110 and supplied to the receiving circuits 112 and 152, and the computation circuits 113 and 153 connected to the respective receiving circuits 112 and 152 create the respective angle information separately.

Another method for controlling by phase-synchronizing the master axis and the slave axis is disclosed, for example, in Japanese Unexamined Patent Publication No. 2005-322076, which synchronizes control while maintaining a desired phase relationship and a desired ratio between different drive axis systems.

There is also proposed a method of synchronized control capable of achieving quick phase synchronization between the master axis and the slave axis, as disclosed in Japanese Unexamined Patent Publication No. H08-202420.

As described earlier, in the master-slave synchronizing method, the position data and the reference signal with a predetermined fixed period, as analog signals output from the master axis position detector 111 provided for the master axis, are each branched and supplied to the receiving circuits 112 and 152 separately provided for the master axis and the slave axis, respectively. It is therefore difficult to synchronize the reference signal receive timing between the receiving circuits 112 and 152 because of variations among parts used in the receiving circuits 112 and 152, different transmission paths used, temperature variations, etc. As a result, the following problem occurs.

FIGS. 10a, 10b, 10c, and 10d are diagrams for explaining how the angle information is generated using the position data output from the master axis position detector. The master axis position detector 111 is constructed, for example, from a rotary encoder, and outputs position data including two signals, i.e., an A-phase signal and a B-phase signal, for example, as shown in FIG. 10a, so as to enable the rotational speed (position) and rotational direction of the master axis to be detected. The master axis position detector 111 outputs a reference signal once in a predetermined fixed period, such as shown in FIG. 10b; the reference signal is, for example, a one-rotation signal. The computation circuits 113 and 153 each read the count value of a position counter, such as shown in FIG. 10c, when the reference signal is received, and again read the count value of the position counter the next time the reference signal is received; then, by calculating the amount of increase from the previous count value, the distance traveled from the reference signal position, such as shown in FIG. 10d, i.e., the angle information within one rotation of the rotor, is computed. However, if, for any one of the above reasons, a displacement occurs in the reference signal receive timing (as indicated by dotted lines in FIG. 10b) between the receiving circuits 112 and 152 separately provided for the master axis and the slave axis, respectively, the count value of the position counter read at the time of the reception of the reference signal becomes different between the master axis and the slave axis, and as a result, a phase displacement occurs in the angle information computed by the respective computation circuits 113 and 153, as shown in FIG. 10d. In this way, since the receiving circuit 112 for the master axis and the receiving circuit 152 for the slave axis are separately provided, if the position data and reference signal output from the same master axis position detector 111 are used, a phase displacement occurs in the angle information computed by the respective computation circuits 113 and 153 because the receive timing is displaced between the receiving circuits 112 and 152. If angle information containing such a phase displacement is used, it is not possible to control the master axis motor 114 and the slave axis motor 154 in a synchronized fashion.

Furthermore, since the prior art master-slave synchronizing method requires the provision of a branch circuit, the cost and size of the motor control apparatus correspondingly increase.

SUMMARY OF THE INVENTION

In view of the above problem, it is an object of the present invention to provide a compact and low-cost motor control apparatus that can control the master axis motor for driving the master axis and the slave axis motor for driving the slave axis accurately in a synchronized fashion.

To achieve the above object, there is provided a motor control apparatus for synchronously controlling a master axis motor for driving a master axis and a slave axis motor for driving a slave axis, including, a master axis position detector which outputs position data of the master axis and a reference signal with a predetermined fixed period, a master axis receiving circuit which receives the position data and the reference signal output from the master axis position detector, a master axis computation circuit which computes a master axis error representing a difference between the position data received by the master axis receiving circuit and the position data acquired at the time of the reception of the reference signal, and a slave axis motor control unit which controls the operation of the slave axis motor by using the master axis error as a command for synchronizing to the operation of the master axis motor.

The reference signal from the master axis position detector is output in synchronism with the master axis position data.

The motor control apparatus further includes a master axis motor control unit which is connected to the master axis computation circuit and which controls the operation of the master axis motor by feeding back the master axis error received from the master axis computation circuit. Since the master axis error is also used by the slave axis motor control unit in order to control the operation of the slave axis motor, the operation of the slave axis motor is synchronized to the operation of the master axis motor.

Provisions may be made to transfer the master axis error from the master axis motor control unit to the slave axis motor control unit.

The motor control apparatus may further include a slave axis position detector which outputs position data of the slave axis and a reference signal with a predetermined fixed period, a slave axis receiving circuit which receives the position data and the reference signal output from the slave axis position detector, and a slave axis computation circuit which computes a slave axis error representing a difference between the position data received by the slave axis receiving circuit and the position data acquired at the time of the reception of the reference signal, and the slave axis motor control unit may control the operation of the slave axis motor so that the difference or ratio between the master axis error and the slave axis error is maintained constant. The reference signal from the slave axis position detector is output in synchronism with the slave axis position data.

Further, at least one of the master axis computation circuit, the master axis motor control unit, and the slave axis motor control unit may include a correcting circuit which corrects the master axis error by using a data transmission delay time occurring between the master axis motor control unit and the slave axis motor control unit.

The master axis is, for example, an axis for driving a tool in a gear generating machine, and the slave axis is an axis for driving a workpiece in the generating machine.

BRIEF DESCRIPTION OF THE DRAWINGS

The present invention will be more clearly understood with reference to the following accompanying drawings.

FIG. 4 is a flowchart illustrating the operational flow of the motor control apparatus according to the embodiment of the present invention.

FIG. 5 is a block diagram showing a modified example of the motor control apparatus according to the embodiment of the present invention.

DETAILED DESCRIPTION

A motor control apparatus for synchronously controlling a master axis and a slave axis will be described below with reference to the drawings. It should, however, be understood that the present invention is not limited to the accompanying drawings, nor is it limited to the particular embodiment described herein.

Figure 1:
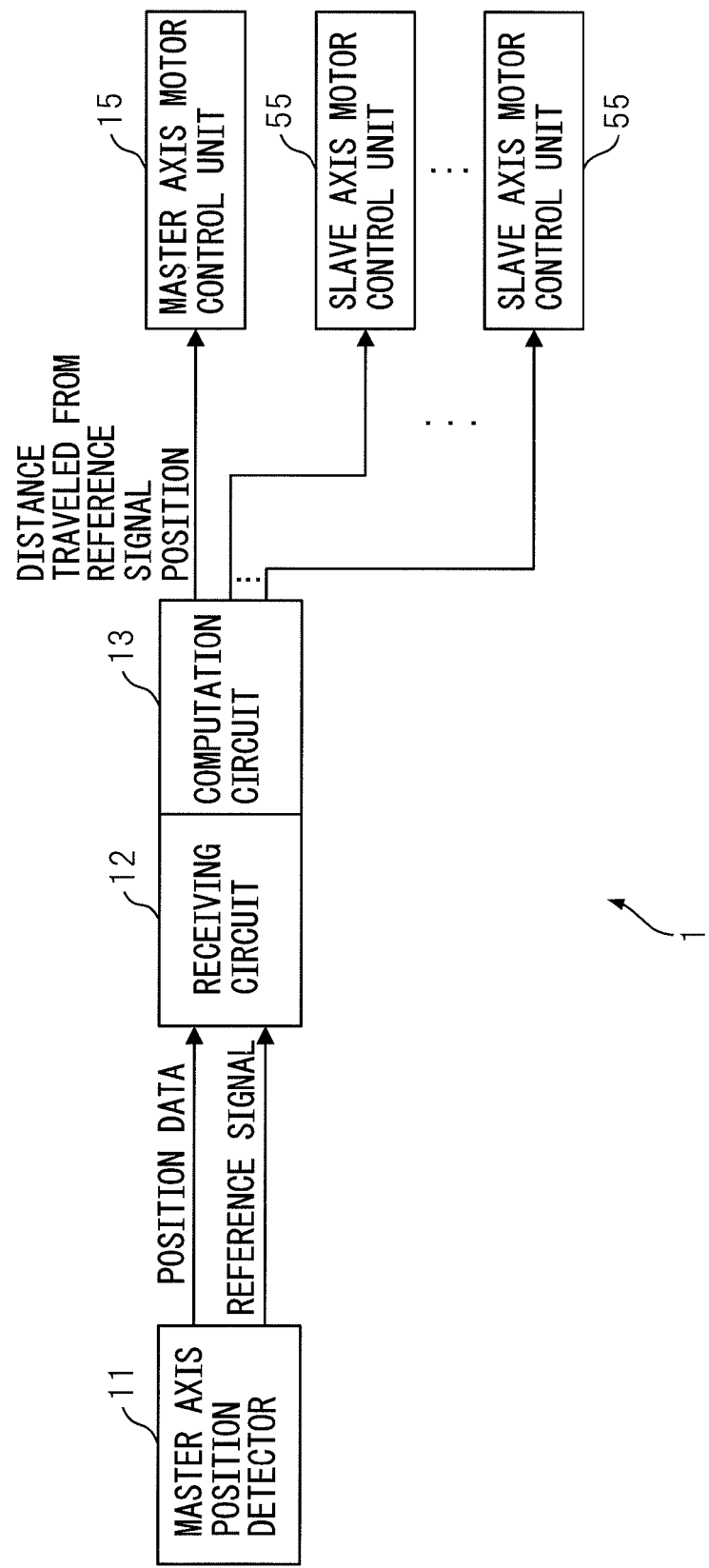
FIG. 1 is a basic functional block diagram of a motor control apparatus according to an embodiment of the present invention.
Figure 2:
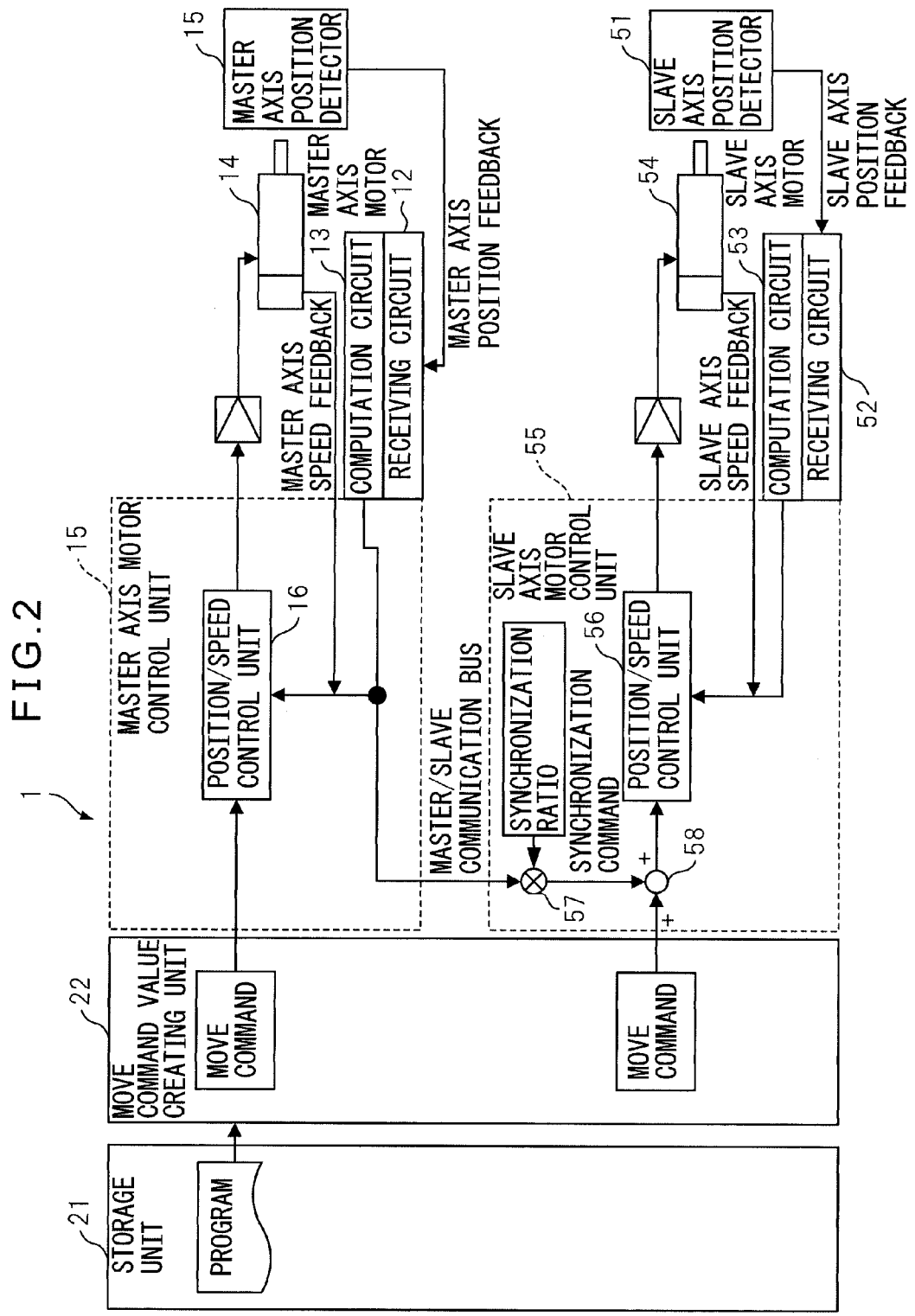
FIG. 2 is a block diagram showing in further detail the configuration depicted in the basic functional block diagram of FIG. 1.

FIG. 1 is a basic functional block diagram of a motor control apparatus according to an embodiment of the present invention. FIG. 2 is a block diagram showing in further detail the configuration depicted in the basic functional block diagram of FIG. 1. The motor control apparatus 1 according to the embodiment of the present invention can be applied to a machine tool equipped with motors one for each drive axis. For example, the master axis is an axis for driving a tool in a machine, and the slave axis is an axis for driving a workpiece in the machine. In the case of a gear driven machine, for example, the master axis is a tool axis for driving a tool such as a grinding wheel or a cutter, and the slave axis is a work axis for driving a workpiece. In the illustrated example, the number of slave axes is shown as one, but the present invention is not limited and more than one slave axis may be provided.

As shown in FIG. 1, according to the embodiment of the present invention, the motor control apparatus 1 for synchronously controlling a master axis motor 14 for driving a master axis and a slave axis motor 54 for driving a slave axis includes, a master axis position detector 11 which outputs position data of the master axis and a reference signal with a predetermined fixed period, a master axis receiving circuit 12 which receives the position data and the reference signal output from the master axis position detector 11, a master axis computation circuit 13 which computes a master axis error representing the difference between the position data received by the master axis receiving circuit 12 and the position data acquired at the time of the reception of the reference signal, and a slave axis motor control unit 55 which controls the operation of the slave axis motor 54 by using the master axis error as a command for synchronizing to the operation of the master axis motor 14. The reference signal from the master axis position detector 11 is output in synchronism with the master axis position data. Since the master axis error represents the difference between the current position data received by the master axis receiving circuit 12 and the position data acquired at the time of the reception of the reference signal received earlier than the current position data, the master axis error can be said to represent the "distance traveled from the reference signal position," and provides, for example, the angle information within one rotation of the rotor of the master axis motor 14.

A further detailed description will be given with reference to FIG. 2. In the motor control apparatus 1 shown in FIG. 2, the master axis position detector 11 is located in close proximity to the master axis being driven by the master axis motor 14, and outputs the position data of the master axis and the reference signal with a predetermined fixed period. The master axis receiving circuit 12 receives the position data and the reference signal output from the master axis position detector 11. The master axis computation circuit 13 computes the master axis error representing the difference between the current position data received by the master axis receiving circuit 12 and the position data acquired at the time of the reception of the reference signal received earlier than the current position data. The master axis error represents the "distance traveled from the reference signal position," as described above. The master axis error is passed to a position/speed control unit 16 in the master axis motor control unit 15 to control the rotor position and rotational speed of the master axis motor 14; the master axis error is also transmitted to the slave axis motor control unit 55 via a communication bus provided between the master axis motor control unit 15 and the slave axis motor control unit 55.

A slave axis position detector 51 is located in close proximity to the slave axis being driven by the slave axis motor 54, and outputs position data of the slave axis and a reference signal with a predetermined fixed period. The reference signal from the slave axis position detector 51 is output in synchronism with the slave axis position data. A slave axis receiving circuit 52 receives the position data and the reference signal output from the slave axis position detector 51. A slave axis computation circuit 53 computes a slave axis error representing the difference between the current position data received by the slave axis receiving circuit 52 and the position data acquired at the time of the reception of the reference signal received earlier than the current position data. Similarly to the master axis error, the slave axis error represents the "distance traveled from the reference signal position." The slave axis error is passed to a position/speed control unit 56 in the slave axis motor control unit 55.

A move command value creating unit 22, under the control of a host numerical control unit (not shown), creates move commands for the master axis motor 14 and the slave axis motor 54, respectively, in accordance with a program stored in a storage unit 21, and supplies the move commands to the master axis motor control unit 15 and the slave axis motor control unit 55, respectively.

The position/speed control unit 16 in the master axis motor control unit 15 controls the rotor position and rotational speed of the master axis motor 14 on the basis of the move command, the rotational speed fed back from the master axis motor 14 (master axis speed feedback), and the angle information fed back from the master axis position detector 11 (master axis position feedback).

On the other hand, the position/speed control unit 56 in the slave axis motor control unit 55 controls the rotor position and rotational speed of the slave axis motor 54 on the basis of the move command, the rotational speed fed back from the slave axis motor 54 (slave axis speed feedback), and the master axis error, i.e., the "distance traveled from the reference signal position," computed by the master axis computation circuit 13. In a modified example, the slave axis motor control unit 55 may control the operation of the slave axis motor 54 so that the difference or ratio between the master axis error and the slave axis error is maintained constant. FIG. 2 shows the modified example in which control is performed so that the master axis error and the slave axis error are maintained at a constant ratio (synchronization ratio); in this example, the master axis error computed by the master axis computation circuit 13 is multiplied in a multiplier 57 by the synchronization ratio, thereby creating a synchronization command. An adder 58 is provided to add the synchronization command to the move command created by the move command value creating unit 22, and the result is supplied to the position/speed control unit 56.

Rather than controlling the operation of the slave axis motor 54 so that the difference or ratio between the master axis error and the slave axis error is maintained constant, as described above, the rotor position and rotational speed of the slave axis motor 54 may be controlled simply by using the master axis error computed by the master axis computation circuit 13; in this case, the multiplier 57, the slave axis receiving circuit 52, and the slave axis computation circuit 53 in FIG. 2 need not necessarily be provided, and the adder 58 may be configured to simply add the master axis error computed by the master axis computation circuit 13 to the move command created by the move command value creating unit 22 and to supply the result to the position/speed control unit 56. This serves to further reduce the size and cost of the motor control apparatus 1.

Figure 3A:
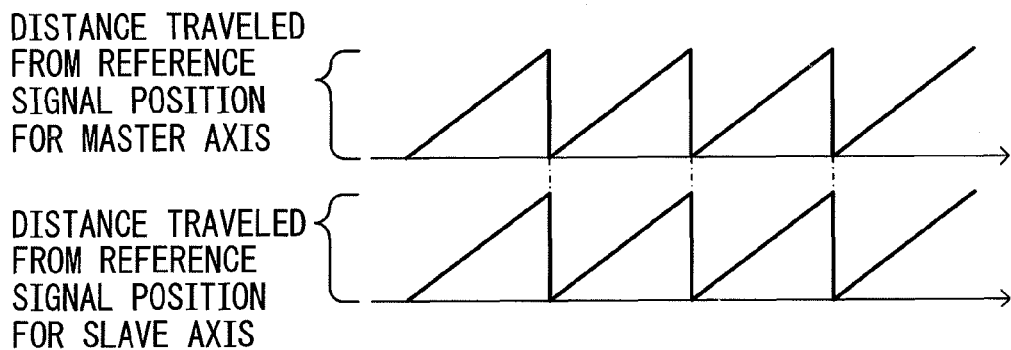
FIGS. 3a, 3b, and 3c are diagrams for explaining modified examples of synchronized control performed by a slave axis motor control unit.
Figure 3B:
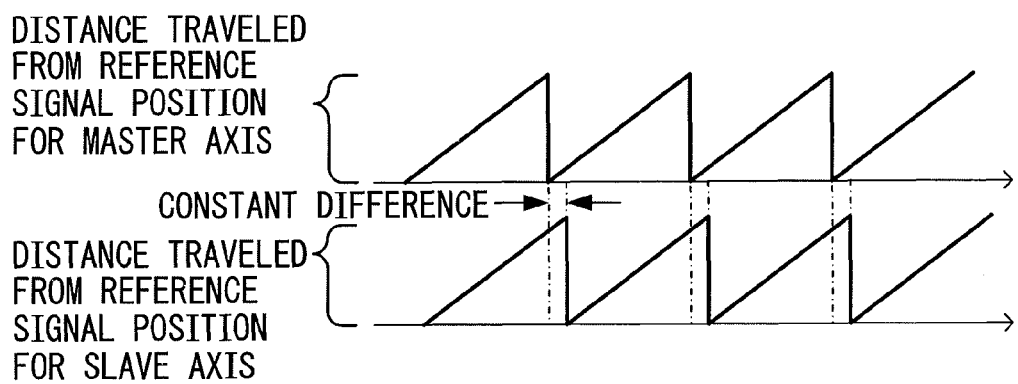
Figure 3C:
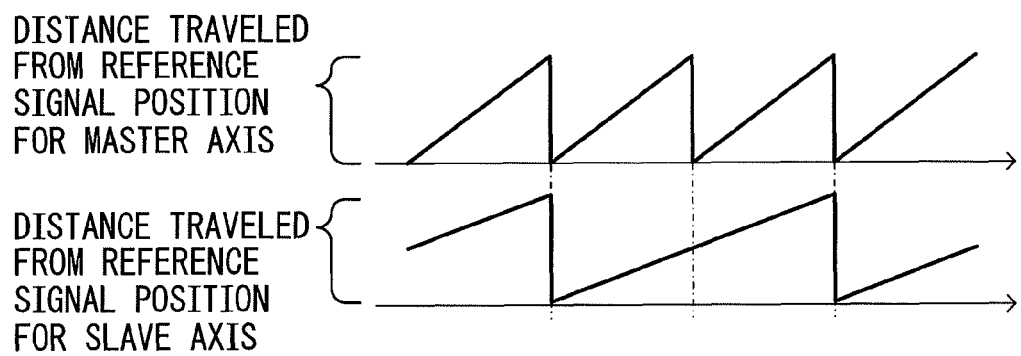

FIGS. 3a, 3b, and 3c are diagrams for explaining modified examples of the synchronized control performed by the slave axis motor control unit. For reference, FIG. 3a shows the case in which the master axis error computed by the master axis computation circuit 13, i.e., the "distance traveled from the reference signal position" for the master axis, coincides with the slave axis error computed by the slave axis computation circuit 53, i.e., the "distance traveled from the reference signal position" for the slave axis. FIG. 3b shows the phase relationship between the master axis error computed by the master axis computation circuit 13, i.e., the "distance traveled from the reference signal position" for the master axis, and the slave axis error computed by the slave axis computation circuit 53, i.e., the "distance traveled from the reference signal position" for the slave axis, when the operation of the slave axis motor 54 is controlled so as to maintain the difference between the master axis error and the slave axis error constant. FIG. 3c shows the phase relationship between the master axis error computed by the master axis computation circuit 13, i.e., the "distance traveled from the reference signal position" for the master axis, and the slave axis error computed by the slave axis computation circuit 53, i.e., the "distance traveled from the reference signal position" for the slave axis, when the operation of the slave axis motor 54 is controlled so as to maintain the ratio between the master axis error and the slave axis error constant, for example, at 2:1.

In this way, since the master axis motor control unit 15 and the slave axis motor control unit 55 are configured to control the operation of the master axis motor 14 and the slave axis motor 54, respectively, by using at least the master axis error computed by the master axis computation circuit 13, a phase displacement that may occur in the distance traveled from the reference signal position (for example, the angle information) due to a displacement in the receive timing, such as seen in the prior art, can be eliminated, and the master axis motor 14 and the slave axis motor 54 can therefore be controlled accurately in a synchronized fashion. Furthermore, since there is no need to provide a branch circuit for redirecting the master axis position data and reference signal to the slave axis motor control unit 55 as well as to the master axis motor control unit 15, the size and cost of the motor control apparatus 1 can be reduced.

FIG. 4 is a flowchart illustrating the operational flow of the motor control apparatus according to the embodiment of the present invention.

First, in the processing at the master axis side, the master axis receiving circuit 12 in step S101 receives the position data and the reference signal as analog signals from the master axis position detector 11. Next, in step S102, the master axis computation circuit 13 connected to the master axis receiving circuit 12 converts the received position data and reference signal into digital signals. Then, in step S103, the master axis computation circuit 13 computes the "distance traveled from the reference signal position" for the master axis, i.e., the master axis error representing the difference between the current position data received by the master axis receiving circuit 12 and the position data acquired at the time of the reception of the reference signal received earlier than the current position data. In step S104, the master axis computation circuit 13 transmits the master axis error, i.e., the "distance traveled from the reference signal position," to the slave axis motor control unit 55.

The processing at the slave axis side follows the above processing performed at the master axis side; first, in step S201, the slave axis motor control unit 55 acquires the master axis error, i.e., the "distance traveled from the reference signal position," from the master axis computation circuit 13, and creates the command position for the slave axis. Next, in step S202, the slave axis motor control unit 55 controls the rotor position and rotational speed of the slave axis motor 54 by using the acquired master axis error, i.e., the "distance traveled from the reference signal position," and also using the slave axis position information fed back from the slave axis position detector 51 via the slave axis receiving circuit 52 and the slave axis computation circuit 53. The position data detected by the slave axis position detector 51 is thus synchronized to the position data detected by the master axis position detector 11 (step S203).

FIG. 5 is a block diagram showing a modified example of the motor control apparatus according to the embodiment of the present invention. As described earlier, the master axis error computed by the master axis computation circuit 13 is transmitted from the master motor control unit 15 to the slave axis motor control unit 55 via the communication bus provided therebetween; the modified example shown here differs from the motor control apparatus 1 described with reference to FIG. 2 by the inclusion of a correcting circuit which corrects the master axis error by an amount equal to the data communication delay time occurring between the master motor control unit 15 and the slave axis motor control unit 55. The correcting circuit need only be provided in at least one of the master axis computation circuit 13, the master motor control unit 15, and the slave axis motor control unit 55; in the example shown in FIG. 5, the correcting circuit is provided in the slave axis motor control unit 55. For example, suppose that the master axis speed of the master axis motor 14 is V [deg/second] and the data communication delay time occurring between the master motor control unit 15 and the slave axis motor control unit 55 is t [seconds]; then, since the delay amount (position) is V×t [deg], the synchronization command is created by adding this delay amount by an adder 59. In this way, the master axis motor 14 and the slave axis motor 54 can be controlled with higher accuracy in a synchronized fashion. The other circuit component elements are the same as those shown in FIG. 2, and therefore, the same circuit component elements are designated by the same reference numerals, and the details of such circuit component elements will not be further described.

Figure 6:
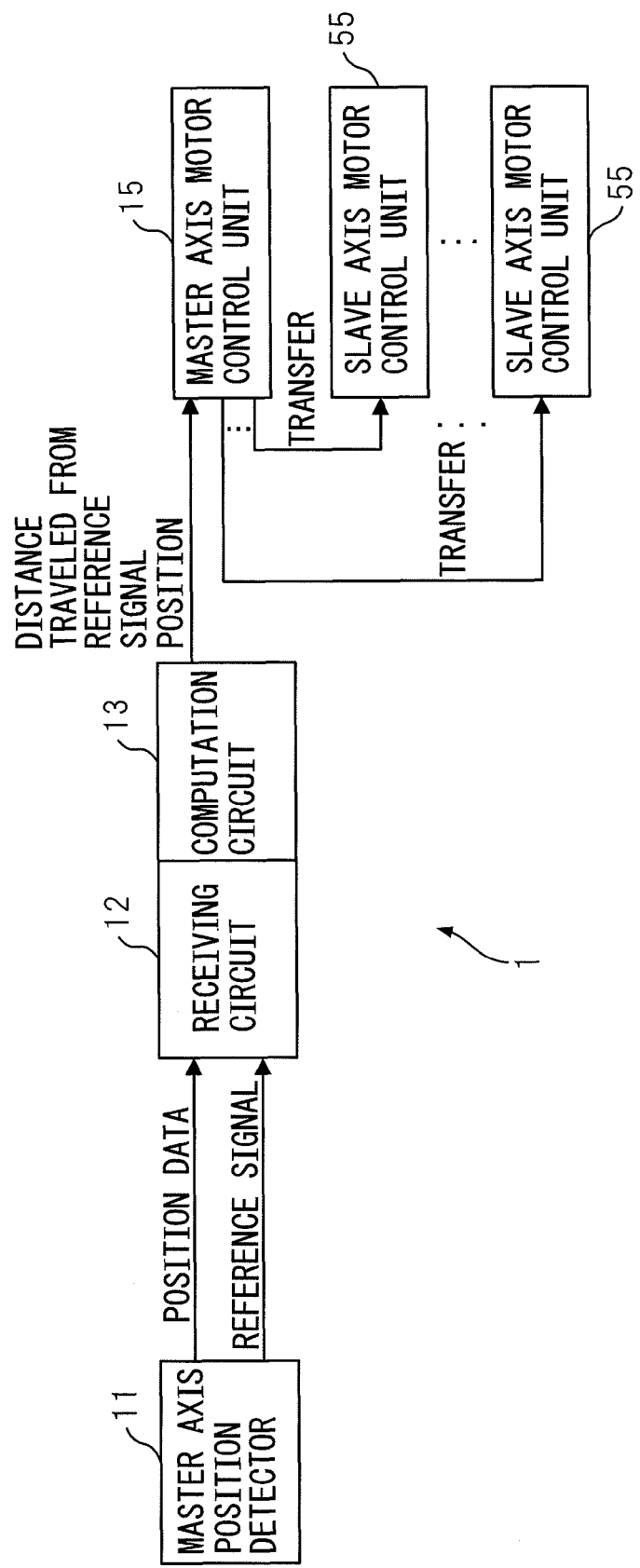
FIG. 6 is a block diagram showing another modified example of the motor control apparatus according to the embodiment of the present invention.
Figure 7:
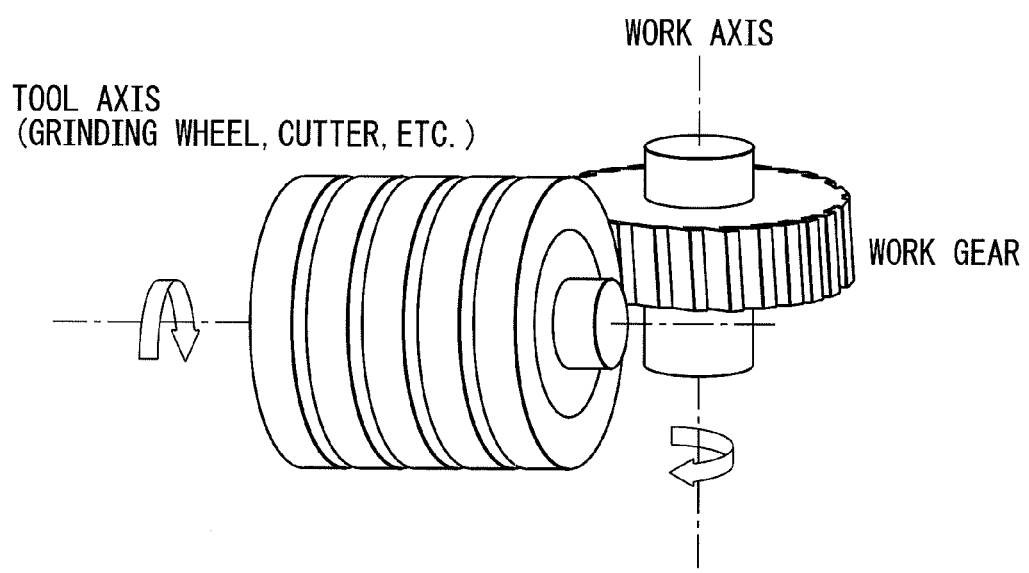
FIG. 7 is a diagram for explaining a tool axis and a work axis in a gear generating machine.
Figure 8:
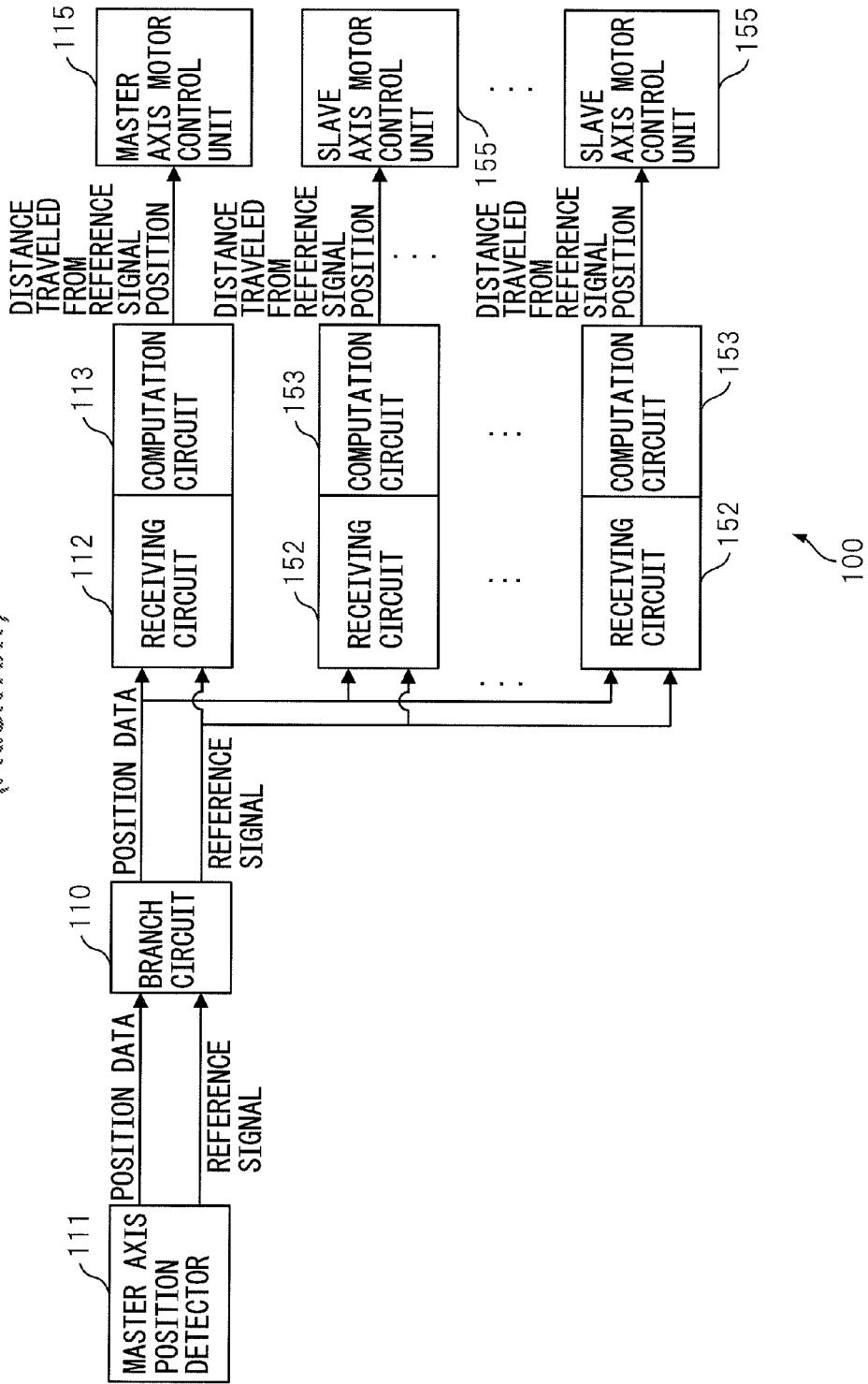
FIG. 8 is a basic functional block diagram schematically illustrating a circuit for synchronized control of a master axis and a slave axis according to the prior art.
Figure 9:
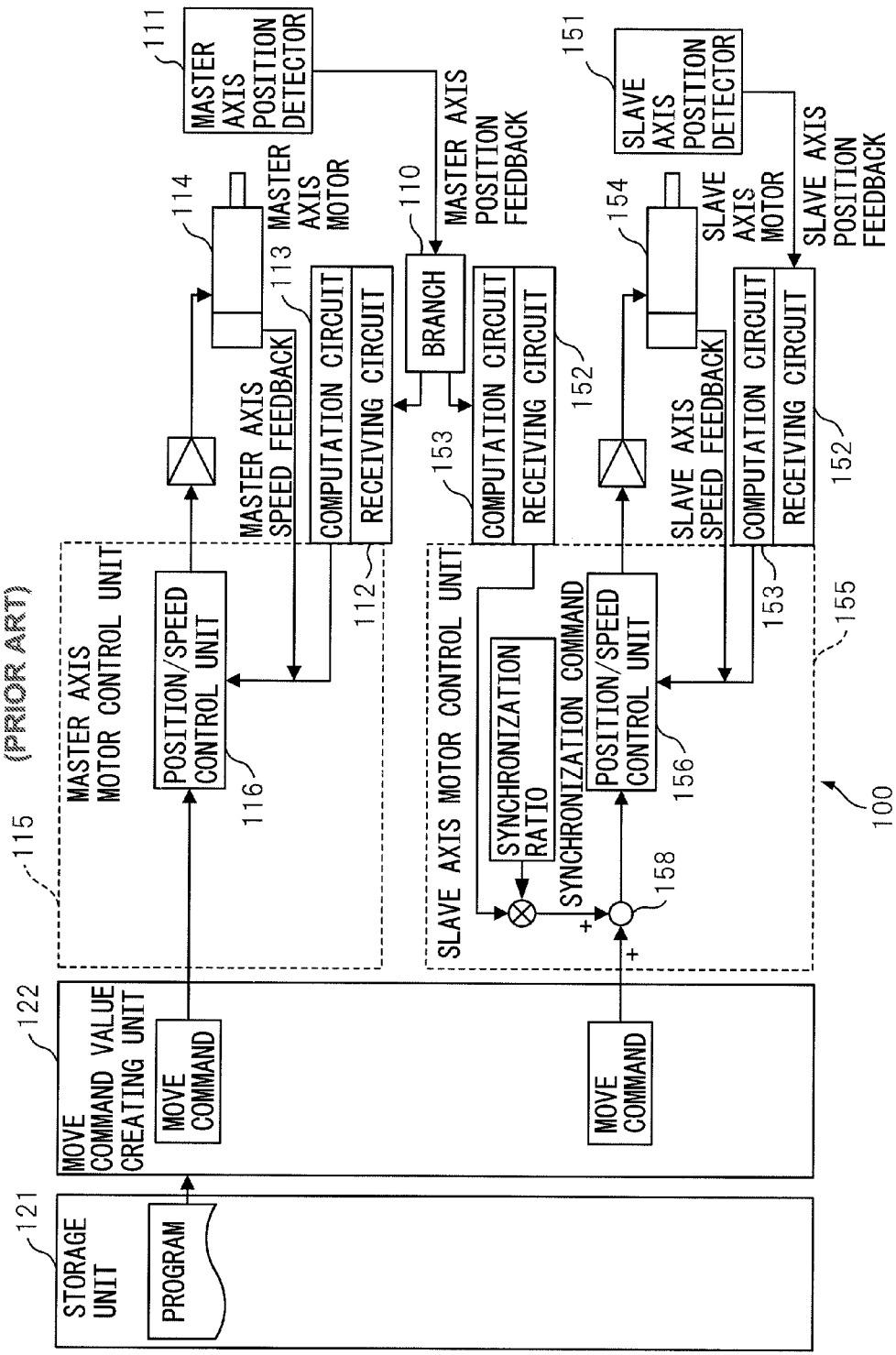
FIG. 9 is a block diagram showing in further detail the configuration depicted in the basic functional block diagram of FIG. 8.
Figures 10A, 10B, 10C, 10D:
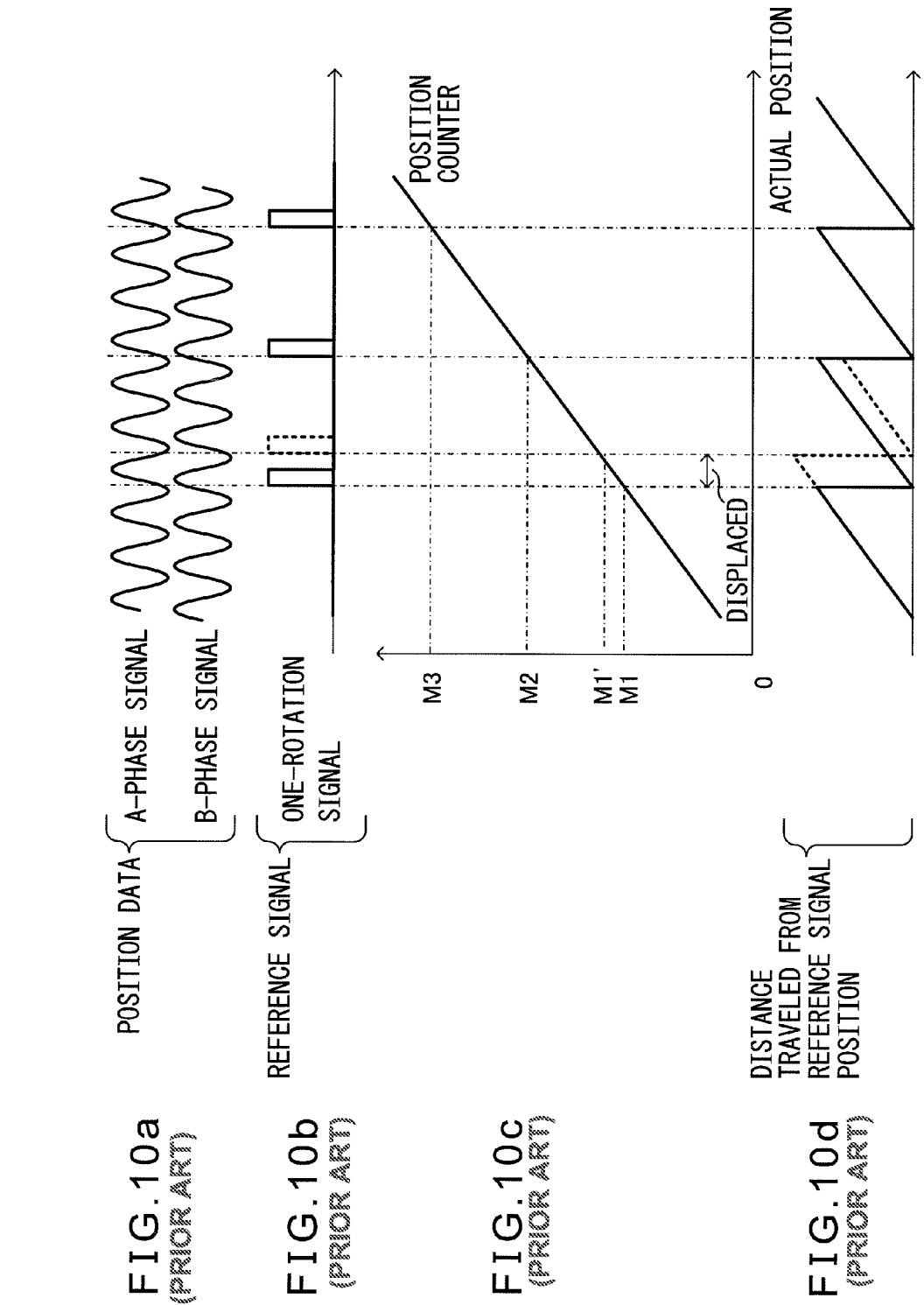
FIGS. 10a, 10b, 10c, and 10d are diagrams for explaining how angle information is generated using position data output from a master axis position detector.

FIG. 6 is a block diagram showing another modified example of the motor control apparatus according to the embodiment of the present invention. This modified example differs from the motor control apparatus 1 described with reference to FIG. 1 in that a dedicated communication bus for connecting with the master motor control unit 15 is provided for each of the plurality of slave motor control units 55 so that the master axis error computed by the master axis computation circuit 13 and fed to the master motor control unit 15 is transferred via the respective communication buses to the corresponding slave motor control units 55. The other circuit component elements are the same as those shown in FIG. 1, and therefore, the same circuit component elements are designated by the same reference numerals, and the details of such circuit component elements will not be further described.

The motor control apparatus 1 according to the embodiment of the present invention may be implemented by suitably combining the modified examples.

The present invention can be applied to a motor control apparatus for synchronously controlling a master axis motor for driving a master axis and a slave axis motor for driving a slave axis. The motor control apparatus can be applied to a machine tool equipped with motors for each drive axis; for example, the master axis may be an axis for driving a tool in a machine, and the slave axis may be an axis for driving a workpiece in the machine.

According to the present invention, the master axis motor for driving the master axis and the slave axis motor for driving the slave axis can be controlled accurately in a synchronized fashion.

According to the present invention, the master axis position data and the reference signal with a predetermined fixed period, output from the master axis position detector, are received by one receiving circuit; then, an error between this position data and the position data acquired at the time of the reception of the reference signal is computed by one computation circuit connected to the receiving circuit, and the operation of the slave axis motor is controlled by using this error as a command for synchronizing to the operation of the master axis motor; accordingly, a phase displacement that may occur in the distance traveled from the reference signal position (for example, the angle information) due to a displacement in the receive timing can be eliminated, and the master axis motor and the slave axis motor can therefore be controlled accurately in a synchronized fashion. Furthermore, since there is no need to provide a branch circuit for redirecting the master axis position data and reference signal to the slave axis motor control unit as well as to the master axis motor control unit, the size and cost of the motor control apparatus can be reduced.

Further, at least one of the master axis computation circuit, the master motor control unit, and the slave axis motor control unit may be configured to correct the master axis error by using the data transmission delay time occurring between the master motor control unit and the slave axis motor control unit; in this case, the master axis motor and the slave axis motor can be controlled with higher accuracy in a synchronized fashion.

What is claimed is:

1. A motor control apparatus for synchronously controlling a master axis motor for rotary-driving a master axis and a slave axis motor for rotary-driving a slave axis, comprising:
    a master axis position detector which outputs position data, which is used to detect the rotational speed and rotational direction of said master axis, and a reference signal with a predetermined fixed period;
    a master axis receiving circuit which receives said position data and said reference signal output from said master axis position detector;
    a master axis computation circuit which computes a master axis error representing a difference between said position data received by said master axis receiving circuit and said position data acquired at the time of the reception of said reference signal;
    a slave axis motor control unit which receives said master axis error and controls the operation of said slave axis motor by using at least said received master axis error as a command for synchronizing to the operation of said master axis motor; and
    a master axis motor control unit which is connected to said master axis computation circuit, and which receives said master axis error from said master axis computation circuit and controls the operation of said master axis motor by using at least said received master axis error, while also transferring said master axis error to said slave axis motor control unit.

2. The motor control apparatus according to claim 1, wherein said reference signal from said master axis position detector is output in synchronism with said master axis position data.

3. The motor control apparatus according to claim 2, further comprising:
    a slave axis position detector which outputs position data of said slave axis and a reference signal with a predetermined fixed period;
    a slave axis receiving circuit which receives said position data and said reference signal output from said slave axis position detector; and
    a slave axis computation circuit which computes a slave axis error representing a difference between said position data received by said slave axis receiving circuit and said position data acquired at the time of the reception of said reference signal, and wherein:
    said slave axis motor control unit controls the operation of said slave axis motor so that the difference or ratio between said master axis error and said slave axis error is maintained constant.

4. The motor control apparatus according to claim 3, wherein said reference signal from said slave axis slave axis position data.

5. The motor control apparatus according to claim 1, further comprising;
    a slave axis position detector which outputs position data of said slave axis and a reference signal with a predetermined fixed period;
    a slave axis receiving circuit which receives said position data and said reference signal output from said slave axis position detector; and
    a slave axis computation circuit which computes a slave axis error representing a difference between said position data received by said slave axis receiving circuit and said position data acquired at the time of the reception of said reference signal, and wherein:
    said slave axis motor control unit controls the operation of said slave axis motor so that the difference or ratio between said master axis error and said slave axis error is maintained constant.

6. The motor control apparatus according to claim 5, wherein said reference signal from said slave axis position detector is output in synchronism with said slave axis position data.

7. The motor control apparatus according to claim 1, wherein at least one of said master axis computation circuit, said master axis motor control unit, and said slave axis motor control unit includes a correcting circuit which corrects said master axis error by using a data transmission delay time occurring between said master axis motor control unit and said slave axis motor control unit.

8. The motor control apparatus according to claim 1, wherein said master axis is an axis for driving a tool in a gear generating machine, and said slave axis is an axis for driving a workpiece in said generating machine.

* * * * *